United States Patent
Kühnelt

[11] 3,734,132
[45] May 22, 1973

[54] SHUTTLE VALVE
[75] Inventor: Herbert F. Kühnelt, Vienna, Austria
[73] Assignee: Hoerbriger Ventilwerke Aktiengesellschaft, Vienna, Austria
[22] Filed: June 25, 1971
[21] Appl. No.: 156,621

[52] U.S. Cl..................137/625.49, 235/201 MC
[51] Int. Cl..................................F16k 11/02
[58] Field of Search..............137/625.48, 625.47, 137/625.27, 625.49; 235/201 ME

[56] References Cited
UNITED STATES PATENTS

| 3,608,587 | 9/1971 | Zbell | 137/625.27 X |
| 3,570,516 | 3/1971 | Mason | 137/625.48 |
| 3,599,672 | 8/1971 | Baghuis | 137/625.48 |
| 3,426,799 | 2/1969 | Kintner | 137/625.48 |
| 3,504,692 | 4/1970 | Goldstein | 235/201 MC |
| 3,540,478 | 11/1970 | Ito | 137/625.5 |
| 3,587,156 | 6/1971 | Sorenson | 137/625.48 X |
| 3,605,807 | 9/1971 | Paschke | 235/201 ME |
| 3,624,752 | 11/1971 | Schmidt | 137/625.49 |
| 3,635,248 | 1/1972 | klee | 137/625.5 |

Primary Examiner—Samuel Scott
Attorney—Watson, Cole, Grindle & Watson

[57] ABSTRACT

A shutle valve serving as a pneumatic selector switch for alternately directing incoming impulses from one input to two different outputs. The valve comprises a housing having a piston therein freely movable between two end positions, provided with a sealing ring and controlling the flow of fluid from the input to the outputs.

6 Claims, 3 Drawing Figures

PATENTED MAY 22 1973                                      3,734,132

INVENTOR

HERBERT F. KUHNELT
BY
WATSON COLE GRINDLE & WATSON

ATTORNEYS

3,734,132

SHUTTLE VALVE

BACKGROUND OF THE INVENTION

The invention relates to a shuttle valve serving as a pneumatic selector switch which is used to divert alternately a pulse applied to one input into two different outputs.

Those skilled in the art are familiar with the problem of diverting a pressure impulse coming from one supply line into two switching or control stations. Single pressure systems can be used for this purpose equipped with simple pilot valves controlled for instance by pushbuttons switching on and off working tools. This possibility is utilized for instance in remote operation of pneumatically operated doors in railways and buses and other pneumatic cylinder control systems in which pistons could be consecutively operated in both directions. Hitherto several control valves were functionally cross-connected to obtain the desired control operation. These switching systems however, are proportionately more expensive, require several separately manufactured components and are also prone to failures.

SUMMARY OF THE INVENTION

The present invention provides a shuttle valve serving as a pneumatic selector switch for alternately directing incoming impulses from one input to two different outputs characterized in that the selector switch comprises a housing having a cylinder bore with a freely movable piston therein, said piston being held in a center position by two opposing springs, the cylinder bore further being provided with an annular recess into which an input channel is provided, while the output channels are provided at both ends of the cylinder bore on opposite sides of the piston and wherein a sealing ring is provided around the piston and protruding into the annular recess, said annular recess being wider than the sealing ring.

In the center position, the sealing ring rests against one side of the annular recess and therefore seals it. Therefore the input pressure pulse is diverted towards the non-sealed side of the annular recess along the piston towards the output in this part of the cylinder bore. The pressure, which builds up on this side of the piston, moves it in an opposite direction. The sealing ring impinges against the wall of the annular recess and slides along the piston. As soon as the pressure ceases, the spring pressure pushes the piston back to its original position, carrying with it the sealing ring which now impinges against another wall of the annular recess. A subsequent impulse, therefore, is directed to the other output. The piston is moved to the opposite position relative to the fixed sealing ring bringing the ring to its original position, so the following impulse would be again directed to the first output, thus the incoming impulse would be changed over from one output to another. The extremely simple construction of the impulse selector switch according to the invention, resulting in operational efficiency and greater reliability, is particularly advantageous.

In a further embodiment of the invention the cylinder bore and the piston can be approximately of the same length and provided with coil springs and spring plates at the face ends of the piston, the spring plates project radially over the cylinder bore and cover the abutments in the housing. To provide unhindered flow of a pressure medium from the cylinder bore into the outputs, the spring plates could be provided with through passages in the region of the cylinder bore, e.g., in the form of holes or star-shaped openings.

In a further variation of the invention the spring plates with their edge portions extending radially over the cylinder bore may control venting passages in the housing abutments. In this way a forced air release would be obtained of the output non-energized by the impulse as soon as the piston is moved by the impulse into one of its end positions thereby lifting one of the spring plates and thus uncovering the corresponding venting passage.

In the simplest and preferred embodiment of the impulse selector switch according to the invention the sealing ring consists of a ring having a substantially circular cross-section placed in one of two annular grooves provided side by side on the piston. The provision of annular grooves secures the positioning of the sealing ring at both ends, which springs out from one groove to another abutting more positively against both sides of the cylinder bore cavity.

The impuls selector switch can finally be supplemented with an actuating rod operating against the end face of the piston actuated axially by pneumatic, electric or magnetic means. By the means of this actuating rod, the piston could be positioned at any time in a desired position by the introduction of a re-set signal. By this arrangement the selector switch according to the invention could be utilized in a binary counting system with a re-set signal, which could be employed as a counter element in a dual system control by which several interconnected impulse switches could be used.

BRIEF DESCRIPTION OF THE DRAWING

The invention will now be described, by way of example with reference to the accompanying drawings, in which.

DESCRIPTION OF PREFERRED EMBODIMENTS

Figure 1:
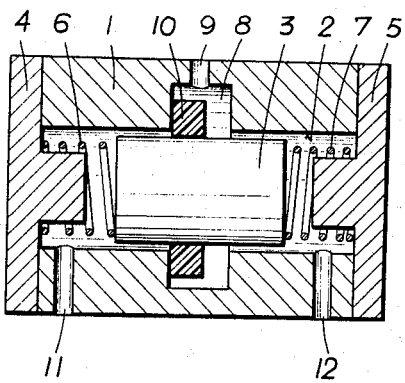
FIGS. 1 and 2 show a simplified embodiment of an impulse selector switch according to the invention in two positions both in axial cross-section along the axis.
Figure 2:
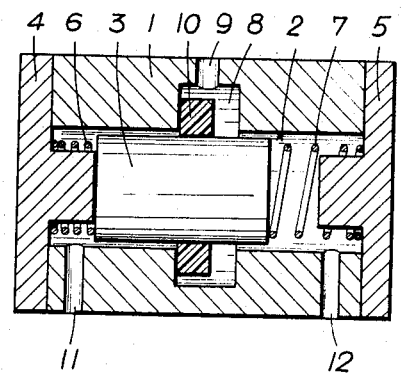

The selector switch shown in FIGS. 1 and 2 consists of a housing 1 with a cylinder bore 2 and a piston 3 freely movable in the cylinder bore 2. The cylinder bore 2 is closed on both ends with covers 4 and 5 with coil springs 6 and 7 provided on both ends of the piston 3 between the piston 3 and covers 4 and 5, respectively. The forces applied on both ends of the piston 3 by the springs 6 and 7, respectively, keep it in a neutral center position as shown in FIG. 1. A slot forming cavity 8 is provided in the middle of the cylinder bore 2 into which an input channel 9 is provided. A sealing ring 10 seated on the piston 3 with a light pressure and protruding into the cavity 8 is also provided. The cavity 8 is wider in an axial direction of the cylinder bore 2 than the sealing ring 10. On both ends of the cylinder bore 2, two output channels 11 and 12 provided through the housing 1.

In the position shown in FIG. 1, piston 3 is in the center position while the sealing ring 10 presses against the left hand wall of the cavity 8 and seals it, therefore, the pressure impulse introduced into the input channel 9 flows along the right hand wall of the cavity 8 into a gap between the cylinder bore 2 and piston 3 and through the output 12. Pressure build-up on the right hand face end of the piston 3 in the cylinder bore 2 displaces the piston 3 towards the left against the pressure of spring 6 to the position shown on FIG. 2. The sealing ring 10, pressing against the left hand wall of the cavity 8 slides along the piston 3 while still sealing the left hand side of the cavity 8. As soon as the pressure through input 9 ceases and incoming channels are depressurized, the pressure of the spring 6 causes the piston 3 to return to its initial neutral center position, as shown in FIG. 1. Friction-bound to the piston 3, the sealing ring 10 moves with it, until it seals this time the right hand wall of the cavity 8. The next impulse, therefore, appearing in the input channel 9, passes on the left hand side of the cavity 9 to the left hand face end of the cylinder bore 2 into the output channel 11. With pressure build-up on the left hand face end of the piston 3, the piston 3 is displaced towards the right and the sealing ring pressure release of the input 9, slides to the left on the piston 3. With pressure release of the input a, piston 3, activated by spring 7, is moved to the neutral center position and again the left wall of the cavity 8 is sealed off, so that the following impulse would again be directed to the output 12. The pulses introduced to the input 9 are therefore alternatively switched over between outputs 11 and 12.

Figure 3:
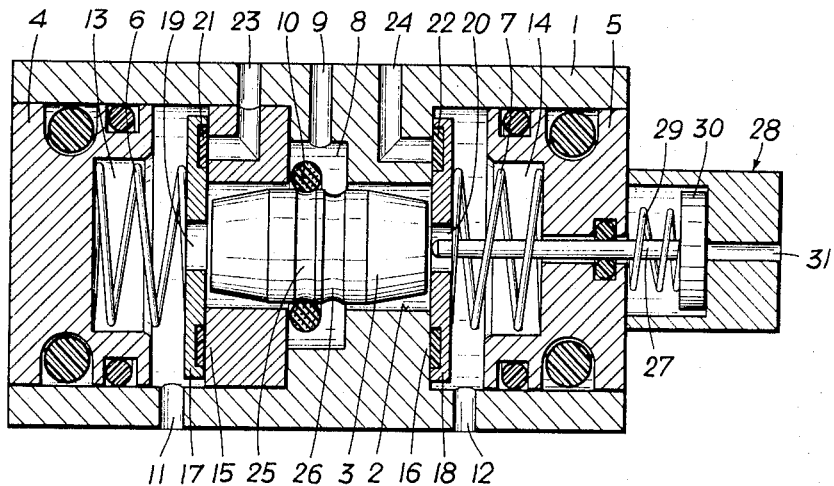
FIG. 3 shows an axial cross-section along the axis of a binary counting system according to the invention with a re-set pulse.

Referring now to FIG. 3, another embodiment of the invention is shown, wherein a cylinder bore 2 and piston 3 are provided in a housing 1 with two chambers 13 and 14 also provided therein. Spring retaining plates 17 and 18 supporting coil springs 6 and 7 respectively are seated against abutments 15 and 16 provided for this purpose in the housing 1, and in the region of the cylinder bore 2, the spring plates 17 and 18 are provided with passages 19 and 20 for the flow of fluid therethrough. With their edge portions extending radially over the cylinder bore 2 and provided with gaskets 21 and 22 the spring plates 17,18 control air release channels 23 and 24 respectively provided in the housing abutments 15 and 16.

Forced depressurization of each chamber 13 and 14 just not passes through by the impulse and corresponding outlets 11 and 12 takes place through the air release channels 23 and 24 which open each time the piston 3 is moved to an end position wherein a spring plate 17 or 18 is lifted from the corresponding air release channel 23 and 24 respectively. In addition, to prevent accidental pressurizing of non-energizing outputs by leaks which could occur through insufficient sealing by ring 10, the pressure could immediately be released through the release channels. The spring plates 17 and 18 also serve to define the mid-position of piston 3 more precisely.

As shown in FIG. 3, the sealing ring 10 in this embodiment consists of a ring of circular cross-section seated in annular grooves 25 and 26 provided side by side on the piston 3. The movement of the piston 3 causes the ring 10 to be displaced from one groove to another, so that the positions of the grooves 25,26 which are exactly determined secure positive sealing against the walls of the cavity 8 without free movement of the ring 10. To avoid complete closure of holes or passages 19,20 in the spring plates 17,18 by the face ends of piston 3, piston 3 could be made slightly shorter than the cylinder bore 2 or provided with radial grooves or the like on its end faces. The spring plates 17,18 could be provided with further holes or be star-shaped.

An operating pin 27 passing through a sealed passage in cover 5 is provided as part of a control device 28. The control device 28 consists of a control piston 30 loaded by spring 29 which can be operated through a passage 31 by a re-set impulse. The re-set impulse introduced through the passage 31 moves the setting piston 30 in FIG. 3 towards the left bringing the operating pin 27 into contact with piston 3, by which action the sealing ring 10 springs out from the groove 25 into the groove 26. When the re-set impulse ceases, the piston 3 actuated by spring 6 returns to its center position bringing the sealing ring 10 against the right hand wall of the cavity 8. The first control impulse therefore, appearing after the application of a re-set impulse would be set for the output 11. By means of the re-set device 28 the selector switch can be set to a predetermined position. The selector switch as in FIG. 3 could thus be built into a full scale binary counting system with a re-set signal input. Functionwise the operation of the selector switch itself shown in FIG. 3 corresponds basically to that described in FIGS. 1 and 2.

I claim:

1. A shuttle valve serving as a pneumatic selector switch for alternately directing incoming pulses automatically from one input to one of two outputs, comprising: a housing having a cylinder bore therein; a freely movable piston located within said bore; opposing spring means maintaining said piston in a center position within said bore; said housing having also an annular recess therein located between the ends of said piston; said housing further having an input channel extending into said recess, and an output channel extending into said bore outwardly of each of said piston ends; and a sealing ring mounted about said piston and protruding into said recess, the width of said recess being greater than the width of said sealing ring, said sealing ring being mounted for movement along the axis of said piston and bearing against one wall of said recess when said piston is in said center position, whereby said ring is shifted along said piston in one direction as said piston is moved in the opposite direction by the impulse fed through said input channel and bearing against one of said piston ends thereby permitting the impulse to be directed to only one of said output channels lying outwardly of said one end, and whereby said piston moves along said axis in said one direction upon depressurization thereby returning to said center position so that said ring bears against the opposite wall of said recess to permit the impulse through said input channel to bear against the other of said piston ends to thereby move said piston further along said axis in said one direction thereby causing said ring to shift along said piston in said opposite direction so as to permit the impulse to be directed to only the other of said output channels lying outwardly of said other piston end.

2. A shuttle valve as claimed in claim 1, wherein the sealing ring comprises a ring having a substantially circular cross-section seated in one of two annular grooves provided side by side around the circumference of the piston.

3. A shuttle valve as claimed in claim 1, wherein at least on one end face of the piston an actuating plunger is provided which extends through the housing for axially positioning said piston by a control device actuated pneumatically, electrically or magnetically.

4. A shuttle valve as claimed in claim 1, wherein said housing is provided with annular abutments on opposite sides of the piston, said abutments facing away from the piston and defining said bore, and wherein two spring retaining plates are provided extending over the cylinder bore and covering said abutments, said spring plates being pressed against said abutments by said opposing spring means.

5. A shuttle valve as claimed in claim 4, wherein the spring plates, in the region of the cylinder bore, are provided with passages therethrough.

6. A shuttle valve as claimed in claim 4, wherein pressure relief channels provided in the abutments which are controlled by said plates.

* * * * *